(12) United States Patent
Tai et al.

(10) Patent No.: US 9,411,092 B2
(45) Date of Patent: Aug. 9, 2016

(54) REFLECTION TYPE DISPLAY MODULE AND ELECTRONIC DEVICE USING THE SAME

(71) Applicants: HONG FU JIN PRECISION (ShenZhen) CO., LTD., Shenzhen (CN); HON HAI PRECISION INDUSTRY CO., LTD., New Taipei (TW)

(72) Inventors: Shun-Lung Tai, New Taipei (TW); Ching-Yu Chou, New Taipei (TW); Jia-Bing Fan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 36 days.

(21) Appl. No.: 14/515,686

(22) Filed: Oct. 16, 2014

(65) Prior Publication Data
US 2015/0109546 A1   Apr. 23, 2015

(30) Foreign Application Priority Data
Oct. 17, 2013   (CN) .......................... 2013 1 0484863

(51) Int. Cl.
*G02F 1/1335*   (2006.01)
*G06F 3/041*   (2006.01)
*F21V 8/00*   (2006.01)
*G06F 1/16*   (2006.01)
*G02F 1/1333*   (2006.01)

(52) U.S. Cl.
CPC ............ *G02B 6/0036* (2013.01); *G02B 6/0055* (2013.01); *G02F 1/13338* (2013.01); *G06F 1/1643* (2013.01); *G06F 3/0412* (2013.01)

(58) Field of Classification Search
CPC ............................. G06F 1/1643; G02F 1/13338
See application file for complete search history.

(56) References Cited

U.S. PATENT DOCUMENTS 9,036,240 B2 * 5/2015 Huang ..................... G09G 3/20
345/102
2014/0125601 A1 * 5/2014 Chen ....................... G06F 3/041
345/173

FOREIGN PATENT DOCUMENTS

TW   201419062 A   5/2014

* cited by examiner

*Primary Examiner* — Mariceli Santiago
(74) *Attorney, Agent, or Firm* — ScienBiziP, P.C.

(57) ABSTRACT

An electronic device includes a housing and a display module received in the housing. The display module includes a display panel, a touch panel positioned on the display panel, a light guide plate positioned on the touch panel, a light source positioned at a side of the light guide plate, and a hardened layer positioned on the light guide plate. The light guide plate and the display panel are respectively positioned at opposite sides of the touch panel. The hardened layer covers a surface of the light guide plate away from the touch panel.

19 Claims, 9 Drawing Sheets

REFLECTION TYPE DISPLAY MODULE AND ELECTRONIC DEVICE USING THE SAME

FIELD

The subject matter herein generally relates to display modules, and particularly to a reflection type display module and an electronic device using the reflection type display module.

BACKGROUND

An electronic device, for example an electronic book, can be equipped with a display module for displaying images, words and so on. The display module can be a transmission type display module or a reflection type display module. The transmission type display module can include a display panel, a light source positioned at a side of the display panel, a touch panel positioned at another side of the display panel, and a protective plate positioned on the touch panel. The reflection type display module can include a display panel, a light source and a light guide plate positioned on the display panel, a touch panel positioned on the light guide plate, and a protective plate positioned on the touch panel.

BRIEF DESCRIPTION OF THE DRAWINGS

Implementations of the present technology will now be described, by way of example only, with reference to the attached figures.

DETAILED DESCRIPTION

Figure 1:
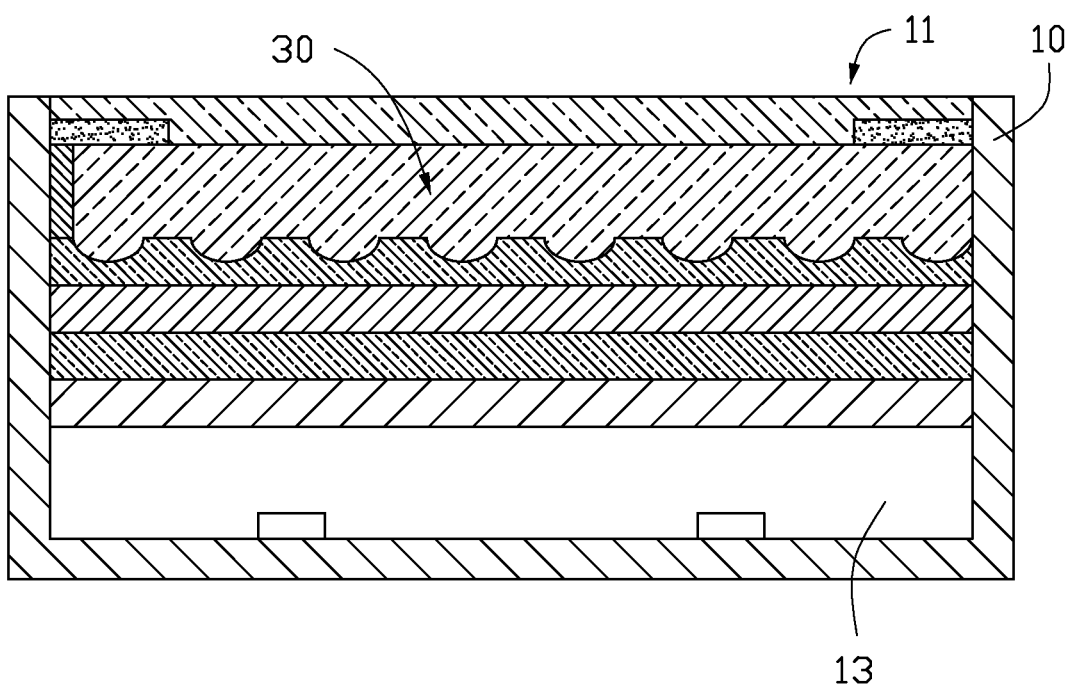
FIG. 1 is a cross-sectional view of a first embodiment of an electronic device including a display module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to an electronic device which can include a housing and a display module received in the housing. The display module can include a display panel, a touch panel positioned on the display panel, a light guide plate positioned on the touch panel, a light source positioned at a side of the light guide plate, and a hardened layer positioned on the light guide plate. The light guide plate and the display panel can be respectively positioned at opposite sides of the touch panel. The hardened layer can cover a surface of the light guide plate away from the touch panel.

FIG. 1 illustrates a first embodiment of an electronic device 100. The electronic device 100 can include a housing 10 and a display module 30 received in the housing 10. The housing 10 can be substantially in a shape of a frame and define a receiving chamber 13 having an opening 11. The opening 11 can communicate the receiving chamber 13 with an outer side of the housing 10. The display module 30 can be coupled to the housing 10 via positioning structures (not shown). The positioning structure can be latching structure, locking structure, pasting structure or other structures to secure the display module 10 in the housing 10. The electronic device 100 can include other functional components, such as a CPU, and a circuit board. For simplicity, introductions of positioning structures and functional components are omitted. In the illustrated embodiment, the electronic device 100 can be an electronic device using a reflection type display module. The display module 30 can be a reflection type display module. The electronic device 100 can be an electronic book, a television, a tablet computer, and so on. In the illustrated embodiment, the electronic device 100 is an electronic book.

Figure 2:
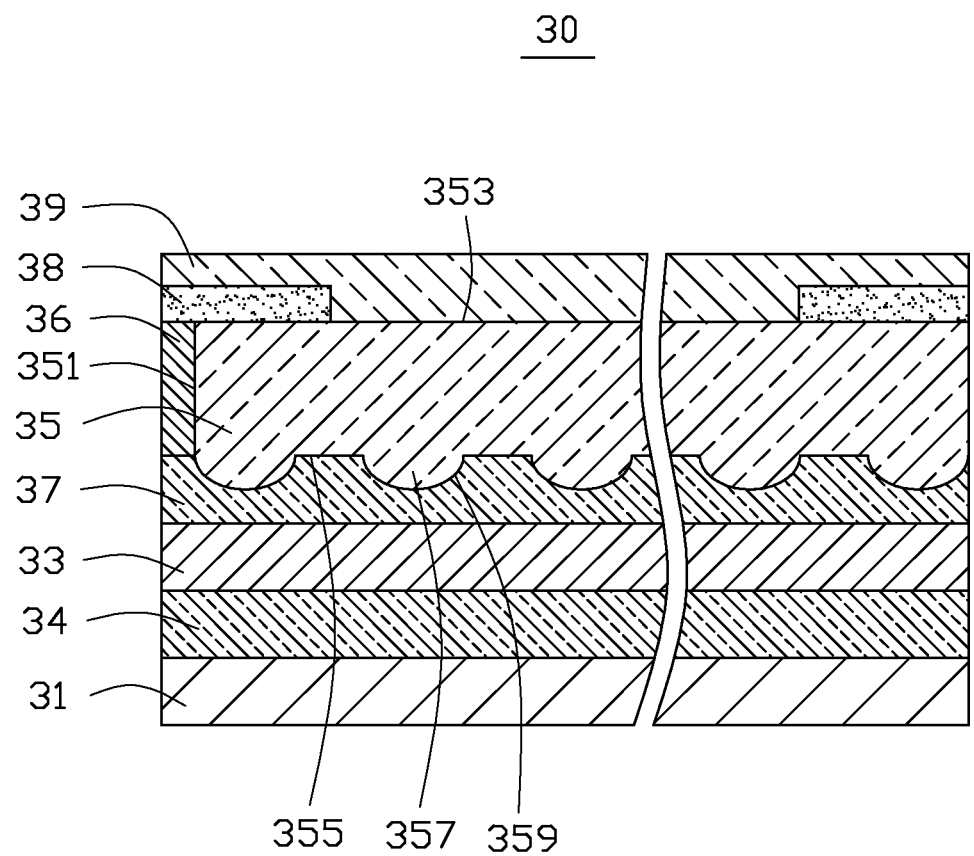
FIG. 2 is a cross-sectional view of the display module of FIG. 1.

FIG. 2 illustrates that the display module 30 can include a display panel 31 received in the receiving chamber 13, a touch panel 33, a first adhesive layer 34, a light guide plate 35, a light source 36, a second adhesive layer 37, a masking layer 38, and a hardened layer 39. The display panel 31 can be coupled to the housing 10 and received in the receiving chamber 13 of the housing 10. The display panel 31 can be configured to deal with texts, images and so on. In the illustrated embodiment, the display panel 31 is an electronic paper module and can include an electronic ink layer (not shown) and other electronic components, such as a pole. In sake of simplify, the display panel 31 is not illustrated in details.

The touch panel 33 can be laminated on the display panel 31 and coupled to the display panel 31 via the first adhesive layer 34. In the illustrated embodiment, the first adhesive layer 34 can be optical glue.

The light guide plate 35 and the light source 36 can be positioned on the touch panel 33 and coupled to the touch panel 33 via the second adhesive layer 37. The light guide plate 35 can be laminated on the touch panel 33. The light guide plate 35 and the display panel 31 can be positioned at opposite sides of the touch panel 33. The light source 36 can be positioned at a same side of the touch panel 33 with the light guide plate 35 and positioned at a side of the light guide plate 35. The light source 36 can emit light and the light can be transmitted into the light guide plate 35 to brighten the texts, images on the display panel 31.

The light guide plate 35 can include an in-light surface 351, a first out-light surface 353, and a second out-light surface 355. The in-light surface 351 can be adjacent to the light source 36 and can couple the first out-light surface 353 and the second out-light surface 355. The first out-light surface 353 and the second out-light surface 355 can be substantially parallel to each other. The second out-light surface 355 can face the touch panel 33. The first out-light surface 353 and the second out-light surface 355 can be on opposite side surfaces of the light guide plate 35. The first out-light surface 353 can be coupled to the hardened layer 39.

The light source 36 can be positioned adjacent to the in-light surface 351 and adjacent to the housing 10. A thickness of the light source 36 can be equal to or less than that of the light guide plate 35. In the illustrated embodiment, a thickness of the light source 36 is equal to that of the light guide plate 35. The light source 36 can emit light and the light can be transmitted into the light guide plate 35 from the in-light surface 351. Then, the light can be emitted from the first out-light surface 353 or the second out-light surface 355. The light source 36 can be dot-type light source or line-type light source. In the illustrated embodiment, the light source 36 can be a point light source including at least one LED. In at least one embodiment, the LED can be replaced with other luminophors, such as a CCFL (cold cathode fluorescent lighting). In the illustrated embodiment, the second adhesive layer 37 can be optical glue.

The light guide plate 35 can be made of PMMA (polymethyl methacrylate), polystyrene-acrylic acid ester copolymer, polycarbonate, polyolefin, polystyrene, styrene-olefin copolymer, or combinations of the above materials. In the illustrated embodiment, the light guide plate 35 is made of polycarbonate. In at least one embodiment, the light guide plate 35 can be made of other light conductive materials different from above mentioned materials. The light guide plate 35 can further have additives, such as UV absorbent, UV stabilizer, antioxidant, heat stabilizer, or light diffusing particles, to achieve different light conductive characteristics. In at least one embodiment, the light guide plate 35 can have one or more than one additive mentioned above.

A transmittance of the light guide plate 35 can be larger than 80% and a haze of the light guide plate 35 can be less than 20%, to achieve a better display. In at least one embodiment, the additives can be other materials different from above mentioned to achieve needed function (such as to increase light out or decrease a heat).

A plurality of reflection protrusions 357 can be formed on the second out-light surface 355 of the light guide plate 35. Each reflection protrusion 357 can include a refection surface 359 coupled to the second out-light surface 355. The reflection surface 359 can contact with the second adhesive layer 37. A part of light in the light guide plate 35 can be reflected by the reflection surface 359 and return back to the light guide plate 35. Another part of light in the light guide plate 35 can be emitted out the light guide plate 35 from the reflection surface 359 and the second out-light surface 355 to the second adhesive layer 37, the touch panel 33, and the display panel 31 in order. The light reaching the display panel 31 can be absorbed or reflected and the reflected light can be transmitted until emitting from the first out-light surface 353. In the illustrated embodiment, the reflection protrusions 357 are spaced apart from each other. The reflection protrusions 357 can be formed on the second out-light surface 355 via screen printing, ink jet printing, nano-imprint, hot stamping, or other methods. In the illustrated embodiment, the reflection protrusions 357 are formed by nano-imprint. In at least one embodiment, the reflection protrusions 357 can be formed on the first out-light surface 353. In at least one embodiment, the reflection protrusions 357 can be formed on both of the first out-light surface 353 and the second out-light surface 355.

In the illustrated embodiment, the reflection surface 359 of each reflection protrusion 357 can be a convex arc surface. Thus, when the reflection surface 359 contacts the second adhesive layer 37, bubbles between the reflection surface 359 and the second adhesive layer 37 can be easily discharged to avoid existing bubbles and improve a display effect. In order to avoid the reflection protrusions 357 are seen with naked eye, the smaller of a size of each reflection protrusion 357 the better display effect can be achieved. A diameter of each reflection protrusion 357 can be smaller than 100 micrometers. In a better choice, the diameter of each reflection protrusion 357 can be smaller than 40 micrometers. In the illustrated embodiment, the diameter of each reflection protrusion 357 is 30 micrometers.

The masking layer 38 can be positioned on a circumference of the light guide plate 35 and cover the light source 36. The masking layer 38 can be positioned adjacent to the opening 11. The masking layer 38 can be configured to shield the light source 36 and reflect light emitted by the light source 36 to the light guide plate 35, to ensure all of the light emitted by the light source 36 can transmit into the light guide plate 35. A optical density of the masking layer 38 can be larger than 3. In the illustrated embodiment, the masking layer 38 is black. The masking layer 38 is a signal layer and formed by printing. In at least one embodiment, the masking layer 38 can be multiple layers. The masking layer 38 can be gray or white.

The hardened layer 39 can cover on the masking layer 38 and the light guide plate 35 and positioned at a side of the light guide plate 35 (or the masking layer 38) away from the second adhesive layer 37. The hardened layer 39 can be in a higher roughness than the light guide plate 35 to scatter light and configured to achieve an anti-glare protection effect. A transmittance of the hardened layer 39 can be larger than 80% and a haze of the hardened layer 39 can be less than 20%, to achieve a better display. The haze can be controlled by the matt surface of the hardened layer 39. The hardened layer 39 can be further configured to protect the light guide plate 35 from damage, thus a hardness of the hardened layer 39 can be higher than that of the light guide plate 35. In order to enhance a touching smoothness of the hardened layer 39, an interface energy of the hardened layer 39 can be less than an interface energy of the light guide plate 35. The interface energy of the hardened layer 39 can be less than 30 dynes/cm. In an optimum choice, the interface energy of the hardened layer 39 can be equal to or less than 25 dynes/cm.

A water contact angle of the hardened layer 39 can be larger than 85 degrees. In an optimum choice, the water contact angle of the hardened layer 39 can be equal to or larger than 90 degrees. The hardened layer 39 can be formed by coating. The hardened layer 39 can be formed by methods known in the art, including, but not limited to, dip-coating, roller coating, spray coating, or flow coating. A coating to form the hardened layer 39 can be silicone resin or acrylate resin coating. If a acrylate resin coating is used, an acrylate resin having additive of fluoro-compoment or siloxane-compoment can be used to improve smoothness. In the illustrated embodiment, a hardness of the hardened layer 39 can be 3~6

H pencil hardness. In the illustrated embodiment, the hardened layer 39 is formed by spray coating.

In use, light emitted by the light source 36 can be transmitted into the light guide plate 35 from the in-light surface 351, and then the light can be transmitted to the second adhesive layer 37, the touch panel 33, the first adhesive layer 34, and the display panel 31 from the reflection surface 359 and the second out-light surface 355. The light can reach to the electronic ink layer of the display panel 31 and lighten texts or images on the display panel 31.

Figure 3:
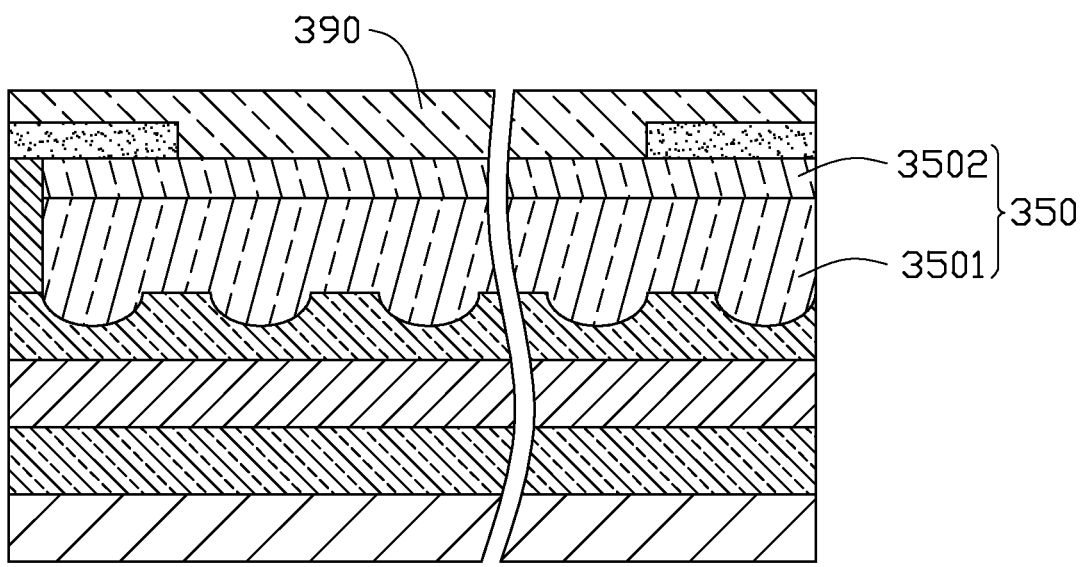
FIG. 3 is a cross-sectional view of a second embodiment of a display module.

FIG. 3 illustrates a second embodiment of a display module 200 which is similar to the display module 30 of the first embodiment. The differences are illustrated below. The light guide plate 350 can be a multiple structure and include a first layer 3501 and a second layer 3502 laminated in order. The first layer 3501 and the second layer 3502 can be made of different materials. The second layer 3502 can be closer to the hardened layer 390 than the first layer 3501. A refractive index of the first layer 3501 can be larger than a refractive index of the second layer 3502. The refractive index of the first layer 3501 can be different from that of particles in the hardened layer 390. A thickness of the first layer 3501 can be 0.25 mm and can be larger than that of the second layer 3502. A hardness of the first layer 3501 can be larger than that of the second layer 3502. The first layer 3501 can be made of polycarbonate. The second layer 3502 can be made of PMMA to increase hardness.

In at least one embodiment, the light guide plate 350 can be three layers, four layers, or more layers. However, a refractive index of a layer adjacent to the opening 11 needs to be larger than that of an adjacent layer. A refractive index of particles in the hardened layer 390 needs to be different to that of a maximum thickness layer of the light guide plate 350. In multiple layers of the light guide plate 350, a layer thereof having a maximum refractive index can have a maximum thickness of the layers. Thus, the layer having a maximum refractive index can be act as a light guiding layer to guide light and can make light easily transmitted to other layers. If a layer having a lower refractive index acts as a light guiding layer, light may remain in the light guide plate 350 and cause light to leak out from edges instead of emitting from out-light surface. In at least one embodiment, reflection protrusions can be formed on the layer having a maximum refractive index.

Experiments confirmed that a thickness of the guiding layer needs to be at least 0.25 mm to achieve a good light guiding effect. In an optimum choice, the thickness of the guiding layer can be larger than 0.4 mm. That is, first layer 3501 can be a thickness larger than 0.4 mm. In an optimum choice, the guiding layer or the first layer 3501 can be made of polycarbonate, COC (cyclic olefin copolymer), or COP (cyclic olefin polymer), polyacrylate, polystyrene-acrylic acid ester copolymer. The light guide plate made of polycarbonate can achieve a high refractive index. The light guide plate made of COC or COP can achieve a low birefringence. When the refractive layer of the guiding layer is at least of 1.53, a conductive effect and a light leaking problem can be balanced well. In the illustrated embodiment, the refractive index of the first layer 3501 is 1.53.

Figure 4:
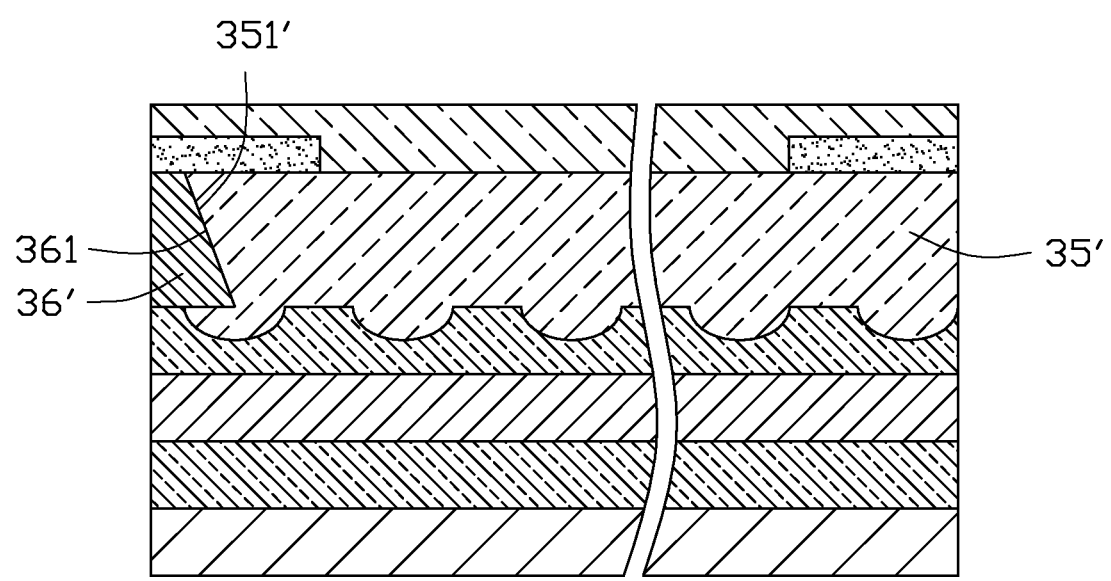
FIG. 4 is a cross-sectional view of a third embodiment of a display module.
Figure 5:
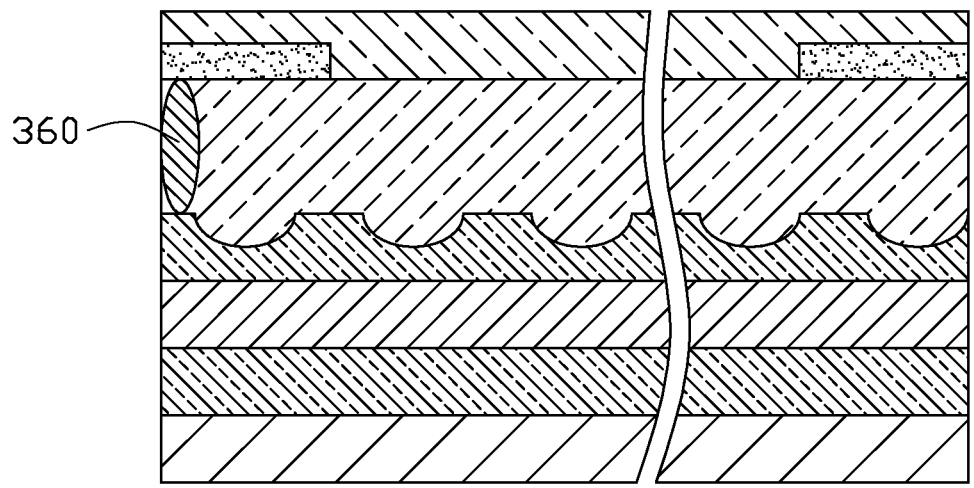
FIG. 5 is a cross-sectional view of a fourth embodiment of a display module.

FIG. 4 illustrates a third embodiment of a display module 300 which is similar to the display module 30 of the first embodiment. The differences are illustrated below. An in-light surface 351' of the light guide plate 35' can be an inclined surface which is polished. A sectional of the light source 36' can be in a shape of substantially a trapezoid and include an inclined surface 361 corresponding to the in-light surface 351'. The inclined surface 361 can be attached to the in-light surface 351'. In at least one embodiment, when a thickness of the light source 36' is larger than that of the light guide plate 35', the light source 36' can be partly positioned at a side of or below the touch panel FIG. 5 illustrates a fourth embodiment of a display module 400 which is similar to the display module 30 of the first embodiment. The differences are illustrated below. A sectional of the light source 360 can be in a shape of substantially a ellipse.

Figure 6:
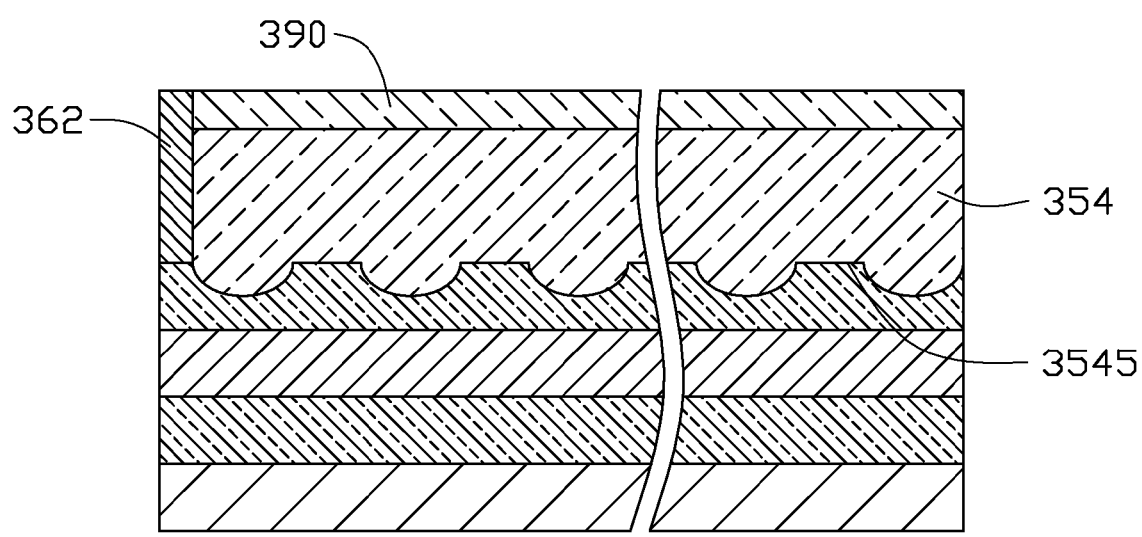
FIG. 6 is a cross-sectional view of a fifth embodiment of a display module.

FIG. 6 illustrates a fifth embodiment of a display module 500 which is similar to the display module 30 of the first embodiment. The differences are illustrated below. The hardened layer 390 can be directly coated on the light guide plate 354 and a masking layer can be omitted. The light source 362 can be placed on the second out-light surface 3545 of the light guide plate 354. A thickness of the light source 362 can be equal to the sum of a thickness of the light guide plate 354 and a thickness of the hardened layer 390. The light source 362 can be positioned at a same side of the light guide plate 354 and the hardened layer 390.

Figure 7:
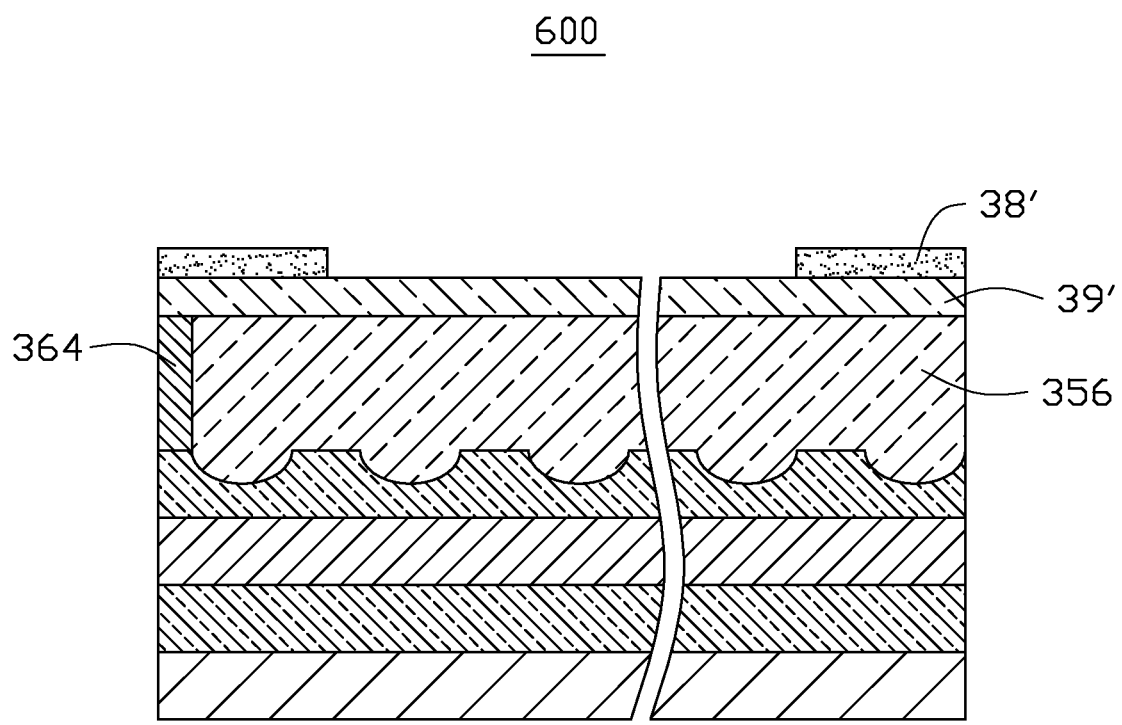
FIG. 7 is a cross-sectional view of a sixth embodiment of a display module.

FIG. 7 illustrates a sixth embodiment of a display module 600 which is similar to the display module 30 of the first embodiment. The differences are illustrated below. The hardened layer 39' can be directly coated on the light guide plate 356. The masking layer 38' can be coated on a circumference of the hardened layer 39' to shield the light emitted by the light source 364. The circumference masking layer 38' can be replaced by the plastic cover merged into the housing.

Figure 8:
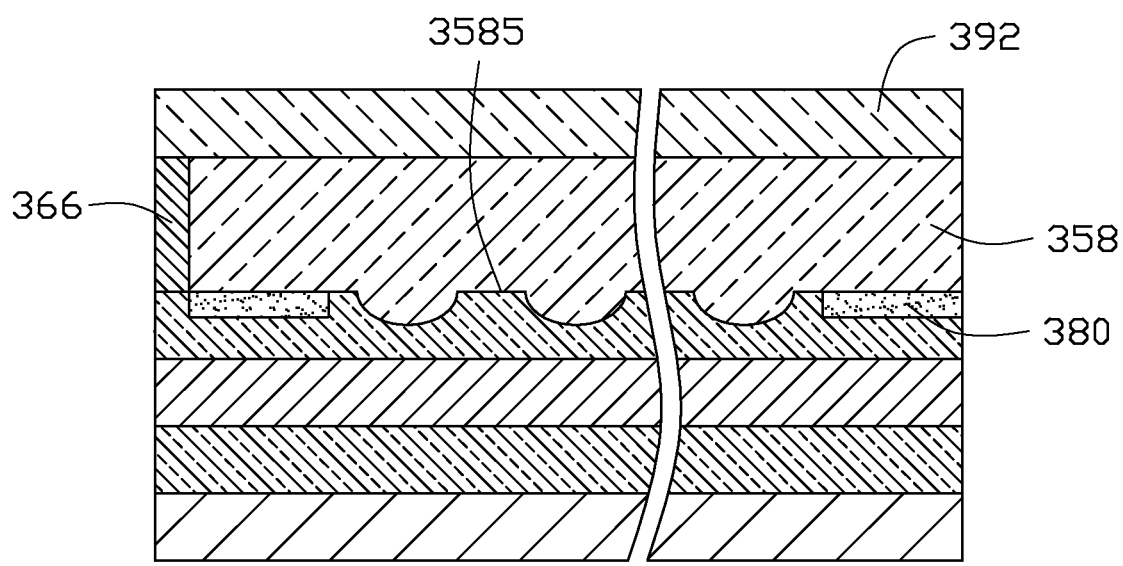
FIG. 8 is a cross-sectional view of a seventh embodiment of a display module.

FIG. 8 illustrates a seventh embodiment of a display module 700 which is similar to the display module 30 of the first embodiment. The differences are illustrated below. The hardened layer 392 can be directly coated on the light guide plate 358 and the light source 366. In the illustrated embodiment, the masking layer 380 is coated on a circumference of the second out-light surface 3585.

Figure 9:
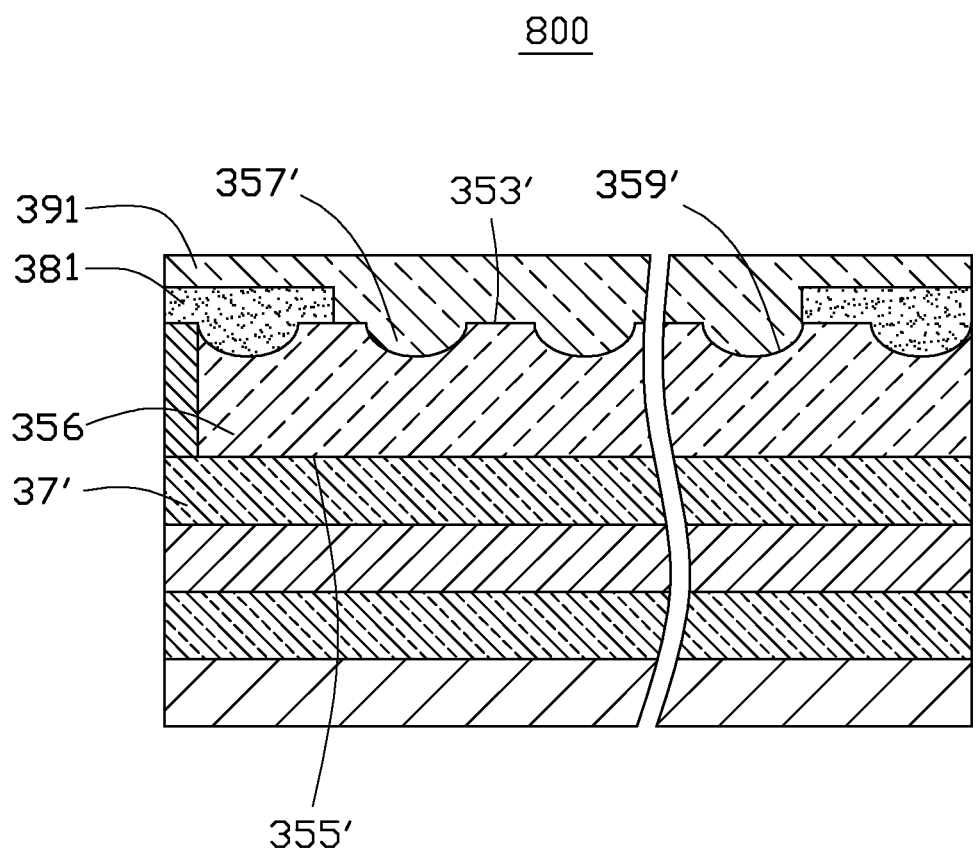
FIG. 9 is a cross-sectional view of an eighth embodiment of a display module.

FIG. 9 illustrates an eighth embodiment of a display module 800 which is similar to the display module 30 of the first embodiment. The differences are illustrated below. A plurality of concaves 357' can be formed on the first out-light surface 353' of the light guide plate 356. A reflection surface 357' can be received in each concave 357' and contact with the hardened layer 391. A diameter of each concave 357' can be less than 40 micrometer. The second out-light surface 355' does not form reflection protrusions thereon. The masking layer 381 can be positioned at a circumference of the light guide plate 356 and partly received in the corresponding concave 357'. The hardened layer 391 can cover the masking layer 381 and the light guide plate 356 and partly received in the concave 357' uncovered by the masking layer 381. Due to the concave 357' not being formed on the second out-light surface 355', bubbles will not occur between the second out-light surface 355' and the second adhesive layer 37'. Because the masking layer 381 and the hardened layer 391 are coated on the light guide plate 356, the concave 357' on the first out-light surface 353' will not result in bubbles. In at least one embodiment, the concave 357' can be defined on the first out-light surface 353' and reflection protrusions can be formed on the second out-light surface 355'.

The embodiments shown and described above are only examples. Many details are often found in the art such as the other features of a display module. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A display module comprising:
    a display panel;
    a touch panel positioned on the display panel;
    a light guide plate positioned on the touch panel;
    a light source positioned at a side of the light guide plate; and
    a hardened layer positioned on the light guide plate, wherein the hardened layer has a higher roughness than the light guide plate to scatter light and configured to achieve an anti-glare protection effect; and
    wherein the light guide plate and the display panel are respectively positioned at opposite sides of the touch panel, the hardened layer covers a surface of the light guide plate away from the touch panel.

2. The display module of claim 1, wherein the hardened layer is coated on the light guide plate by dip-coating, or roller coating, or spray coating, or flow coating.

3. The display module of claim 1, wherein the light guide plate comprises an in-light surface, a first out-light surface, and a second out-light surface, the in-light surface is adjacent to the light source and couples the first out-light surface and the second out-light surface, the second out-light surface faces the touch panel, the first out-light surface and the second out-light surface are opposite side surfaces of the light guide plate, the first out-light surface contacts with the hardened layer.

4. The display module of claim 3, wherein a plurality of reflection protrusions are formed on the second out-light surface of the light guide plate and spaced from each other, each reflection protrusion comprises a refection surface coupled to the second out-light surface, the refection surface is a convex arc surface.

5. The display module of claim 4, wherein a diameter of each reflection protrusion is equal to or smaller than 40 micrometers.

6. The display module of claim 1, wherein the light guide plate comprises at least two layers made of different materials, a layer of the at least two layers having a maximum refraction index is a thickest layer of the at least two layers.

7. The display module of claim 6, wherein a refractive index of one of the at least two layers is equal to or larger than 1.53.

8. The display module of claim 6, wherein one of the at least two layers is made of at least one materials of polycarbonate, cyclic olefin copolymer, cyclic olefin polymer, polyacrylate, and polystyrene-acrylic acid ester copolymer.

9. The display module of claim 6, wherein a layer of the at least two layers adjacent to the hardened layer has a larger hardness than other layers of the at least two layers.

10. The display module of claim 6, wherein the layer of the at least two layers having the maximum refraction index has a thickness equal to or larger than 0.25 mm.

11. The display module of claim 6, wherein the hardened layer has particles therein, a refraction of the particles in the hardened layer is different from the maximum refraction index.

12. The display module of claim 1, wherein an interface energy of the hardened layer is equal to or less than 25 dynes/cm, a water contact angle of the hardened layer is equal to or larger than 90 degrees.

13. The display module of claim 1, wherein the display panel further comprises a masking layer coated on a circumference of the light guide plate and covers the light source, and positioned at a side of the hardened layer adjacent to the light guide plate.

14. The display module of claim 1, wherein the display panel further comprises a masking layer coated or plastic cover on a circumference of the hardened layer, and positioned at a side of the hardened layer away from the light guide plate.

15. The display module of claim 1, wherein the display panel further comprises a masking layer coated on a circumference of the light guide plate and positioned at a side of the light guide plate adjacent to the touch panel.

16. The display module of claim 3, wherein the in-light surface of the light guide plate is an inclined surface, the light source comprises an inclined surface corresponding to the in-light surface, the inclined surface is attached to the in-light surface.

17. The display module of claim 1, wherein a hardness of the hardened layer is larger than a hardness of the light guide plate.

18. An electronic device, comprising:
    a housing, and
    a display module received in the housing and comprising:
        a display panel,
        a touch panel positioned on the display panel,
        a light guide plate positioned on the touch panel,
        a light source positioned at a side of the light guide plate, and
        a hardened layer positioned on the light guide plate, wherein the hardened layer has a higher roughness than the light guide plate to scatter light and configured to achieve an anti-glare protection effect; and
    wherein the light guide plate and the display panel are respectively positioned at opposite sides of the touch panel, the hardened layer covers a surface of the light guide plate away from the touch panel.

19. A display module comprising:
    a display panel;
    a touch panel positioned on the display panel;
    a light guide plate positioned on the touch panel;
    a light source positioned at a side of the light guide plate; and
    a hardened layer positioned on the light guide plate, wherein a hardness of the hardened layer is larger than a hardness of the light guide plate; and
    wherein the light guide plate and the display panel are respectively positioned at opposite sides of the touch panel, the hardened layer covers a surface of the light guide plate away from the touch panel.

* * * * *